(12) United States Patent
Fritz et al.

(10) Patent No.: US 6,243,009 B1
(45) Date of Patent: Jun. 5, 2001

(54) METHOD AND CIRCUIT ARRANGEMENT FOR COMPARING OUTPUT SIGNALS WITH REFERENCE SIGNALS HAVING DIFFERENT REFERENCE LEVELS

(75) Inventors: Andreas Fritz, Brackenheim; Roland Schropp, Erlenbach, both of (DE)

(73) Assignee: TEMIC Semiconductor GmbH, Heilbronn (DE)

( * ) Notice: Subject to any disclaimer, the term of this patent is extended or adjusted under 35 U.S.C. 154(b) by 0 days.

(21) Appl. No.: 09/444,805

(22) Filed: Nov. 22, 1999

(30) Foreign Application Priority Data

Nov. 24, 1998 (DE) .............................................. 198 54 051

(51) Int. Cl.⁷ ..................................................... B60Q 1/52
(52) U.S. Cl. .......................... 340/471; 340/475; 340/458; 340/661; 340/664
(58) Field of Search .................................... 340/471, 475, 340/438, 425.5, 458, 459, 461, 462, 478, 661, 664, 660

(56) References Cited

U.S. PATENT DOCUMENTS

| | | |
|---|---|---|
| 5,801,623 * | 9/1998 | Chen et al. ........................... 340/458 |
| 5,805,061 | 9/1998 | Fritz et al. . |
| 5,905,439 * | 5/1999 | McIntyre ............................... 340/664 |
| 5,907,283 * | 5/1999 | Kim ...................................... 340/661 |
| 6,028,512 * | 2/2000 | Schropp et al. ....................... 340/471 |
| 6,118,384 * | 9/2000 | Sheldon et al. ....................... 340/636 |

FOREIGN PATENT DOCUMENTS 0870646   10/1998   (EP) .

* cited by examiner

*Primary Examiner*—Nina Tong
(74) *Attorney, Agent, or Firm*—W. F. Fasse; W. G. Fasse

(57) ABSTRACT

A blinker-hazard flasher circuit has a single comparator (37) for comparing measured circuit output signals (36) containing information with reference signals having different voltage threshold levels to ascertain the information regarding the status of the flasher circuit, for example whether there is a short-circuit or whether the lamps operated by the circuit are in an operational or failed condition. A reference signal generator (40) for generating reference signals at the different voltage threshold levels receives control signals from a central processing unit. These control signals determine the sequence of the voltage threshold levels. The different levels of the reference signals provide different comparator output signals which are further processed and evaluated for obtaining the status information in response to the measured circuit output signals.

6 Claims, 5 Drawing Sheets

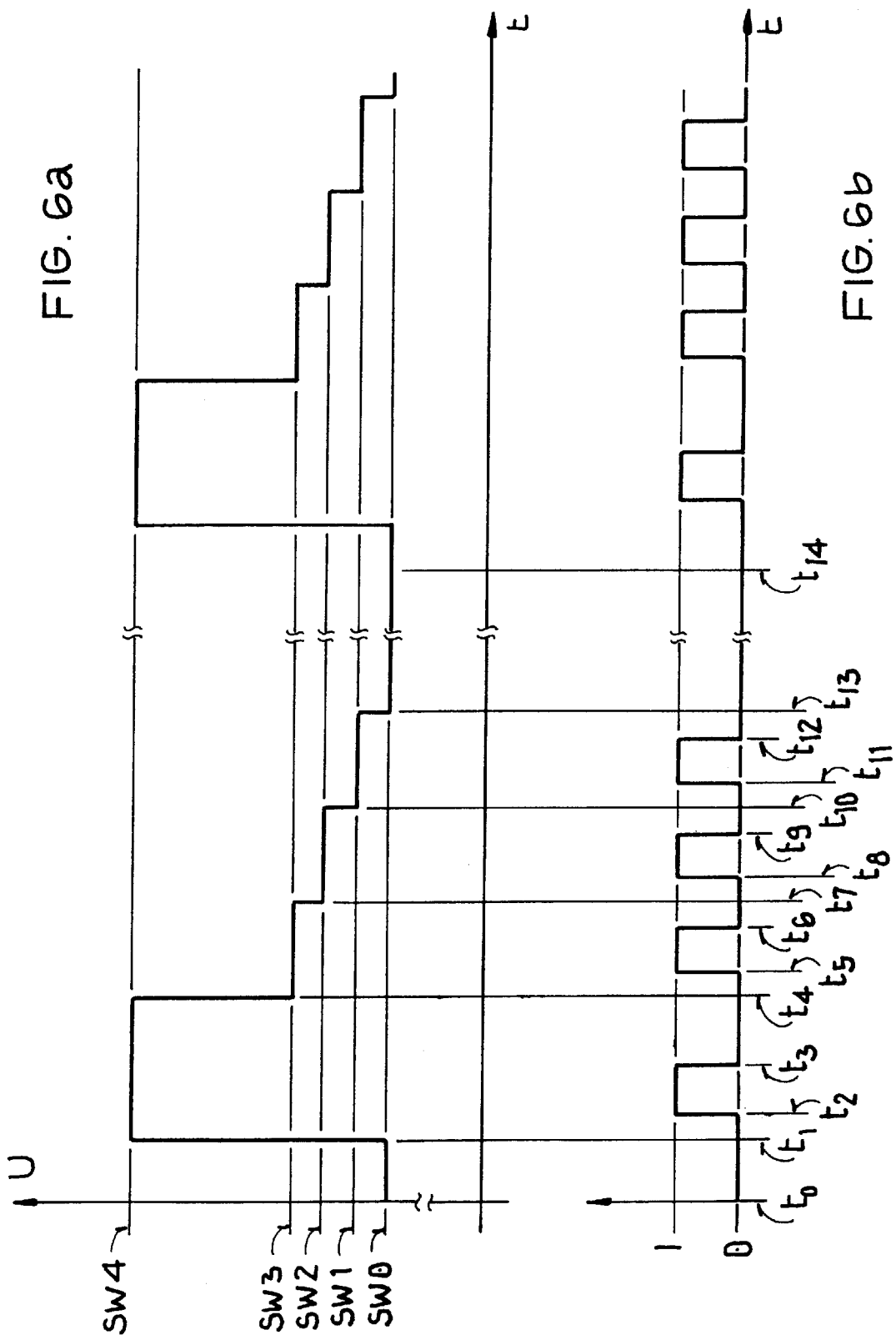

US 6,243,009 B1

METHOD AND CIRCUIT ARRANGEMENT FOR COMPARING OUTPUT SIGNALS WITH REFERENCE SIGNALS HAVING DIFFERENT REFERENCE LEVELS

CROSS-REFERENCE TO RELATED APPLICATION

The present application relates to my U.S. patent application Ser. No. 09/292,451, filed on Apr. 15, 1999, now U.S. Pat. No. 6,028,512, and to U.S. Pat. No. 5,805,061, which issued on Sep. 8, 1998.

PRIORITY CLAIM

This application is based on and claims the priority under 35 U.S.C. §119 of German Patent Application 198 54 051.5, filed on Nov. 24, 1998, the entire disclosure of which is incorporated herein by reference.

FIELD OF THE INVENTION

The invention relates to a method for comparing a measured circuit output signal with reference signals having different reference levels or thresholds. The measured output signals come, for example, from an electronic blinker-hazard flasher circuit. The method is performed in a respective comparator circuit for providing information regarding the operational status of the flasher circuit and its components.

BACKGROUND INFORMATION

Comparator circuits for comparing signals with reference signals are well known in the art, see for example European Patent Publication EP 0,870,646 A1. Present FIG. 2 corresponding to FIG. 3a of the just mentioned European Patent Publication shows an example of a conventional comparator circuit that is used in an electronic blinker, for example for a vehicle. The terms "blinker" or "blinker circuit" in this context refer to that part of the circuit which generates directional or turn signals while the term "hazard flasher" refers to the circuit when it functions as a hazard indicator. These terms may be used in combination or interchangeably.

Present FIG. 2 shows a comparator circuit for an electronic blinker in which a voltage drop across a measuring shunt resistor represents the current flowing through the blinker circuit. The voltage drop is compared with reference voltages having different voltage levels. The various results of the comparing provide indications or informations regarding the operational status of the blinker circuit, for example whether blinker lamps or bulbs have failed, whether additional bulbs have been connected to the blinker circuit, for example the bulbs of a trailer or whether a short-circuit exists in the blinker circuit.

Referring to FIG. 2, the conventional comparator circuit 25 comprises an input terminal 26 that is connected to receive the above mentioned voltage drop from the output of the blinker circuit. The comparator circuit 25 has, for example, four comparators $K_1$, $K_2$, $K_3$ and $K_4$. One input of each comparator is connected in common to the input terminal 26. The other input of each comparator is connected to a different reference voltage $V_{ref1}$, $V_{ref2}$, $V_{ref3}$, and $V_{ref4}$. These different reference voltages are generated by respective voltage divider circuits 33, only one of which is shown in FIG. 2. The output of each comparator is connected to a respective separate signal debouncing circuit 27, 28, 29 and 30. The outputs of the debouncing circuits in turn are connected to respective inputs $IN_1$, $IN_2$, $IN_3$ and $IN_4$ of a central control unit 31 for further processing. Each comparator with its respective reference voltage $V_{ref1}$, $V_{ref2}$, $V_{ref3}$ and $V_{ref4}$ forms thus a discrete stage in the circuit. The reference voltages $V_{ref1}$, $V_{ref2}$, $V_{ref3}$ and $V_{ref4}$ can be generated in any desirable manner, for example with the help of the above mentioned voltage dividers 33 connected with one terminal 32 to a supply voltage and with the other terminal 34 to a reference potential, preferably ground. The size and arrangement of the resistors 33' and a rectifier 33" will be selected in accordance with the required different reference voltage levels or thresholds.

The just described conventional circuit arrangement has the disadvantage that each discrete stage requires its own comparator, its own reference voltage supply circuit, and its own debouncing circuit, whereby the circuit component requirements multiply rapidly when several input signals are to be compared with a plurality of reference voltages. While the circuit components may be identical circuit components, they still increase the efforts and expense for such conventional circuits and make the respective printed circuit chips more expensive.

OBJECTS OF THE INVENTION

In view of the foregoing it is the aim of the invention to achieve the following objects singly or in combination:

to provide a method and circuit arrangement for comparing output signals, particularly blinker or hazard flasher circuit output signals with a plurality of different reference signal levels or thresholds in a single comparator to thereby reduce the number of required identical circuit components;

to provide a simple, yet effective monitoring circuit for checking the operational status of another circuit such as a blinker circuit or hazard flasher and its peripheral components such as lamps;

to operate such monitoring circuits with an optimally low power consumption; and to provide information regarding a short-circuit, operating and/or failed circuit components, and the number of certain components such as lamps.

SUMMARY OF THE INVENTION

According to the method of the invention a measured circuit output signal that contains status information regarding a monitored circuit, is compared in a single comparator with different voltage reference levels or thresholds to ascertain the respective status information. The present method is characterized by the following steps. A control unit provides input control signals to a comparator signal level generator circuit whereby each control signal causes the comparator signal level generator to generate a certain voltage reference threshold or level that differs from other thresholds. The measured output signal from the circuit to be monitored is used as an input signal to the single comparator for comparing with the respective reference voltage level. The comparator output signals are then further processed for evaluation and ascertaining the status information regarding the circuit that is being monitored. Preferably, the output signals from the single comparator are debounced in a single signal debouncing circuit.

The circuit arrangement according to the invention for performing the present method is characterized by a control unit connected with its control output through a conductor to a reference voltage level generator input having an output connected to one input of a single comparator which thus receives different reference thresholds as said one input. The other input of the single comparator is connected to the output voltage of the circuit to be monitored such as a blinker hazard flasher circuit to receive the measured voltage circuit output signal. The output of the single comparator is connected to further circuits for signal processing to ascertain the status information. In a preferred embodiment the output of the signal comparator is connected to a signal debouncing circuit providing at its output a signal for further processing and for displaying or indicating the various status informations of the monitored circuit.

The main advantage of the invention is seen in that by using but one comparator and but one debouncer circuit for processing several input signals, substantial savings are achieved in form of smaller size integrated circuit chips, thereby reducing production costs and the current or power consumption of the monitoring circuit arrangement of the invention.

BRIEF DESCRIPTION OF THE DRAWINGS

In order that the invention may be clearly understood it will now be described in connection with example embodiments, with reference to the accompanying drawings, wherein:

FIGS. 6a and 6b show, as a function of time, the different reference voltage level thresholds and the respective points of time when measuring, comparing and debouncing take place.

DETAILED DESCRIPTION OF PREFERRED EXAMPLE EMBODIMENTS AND OF THE BEST MODE OF THE INVENTION

Figure 1:
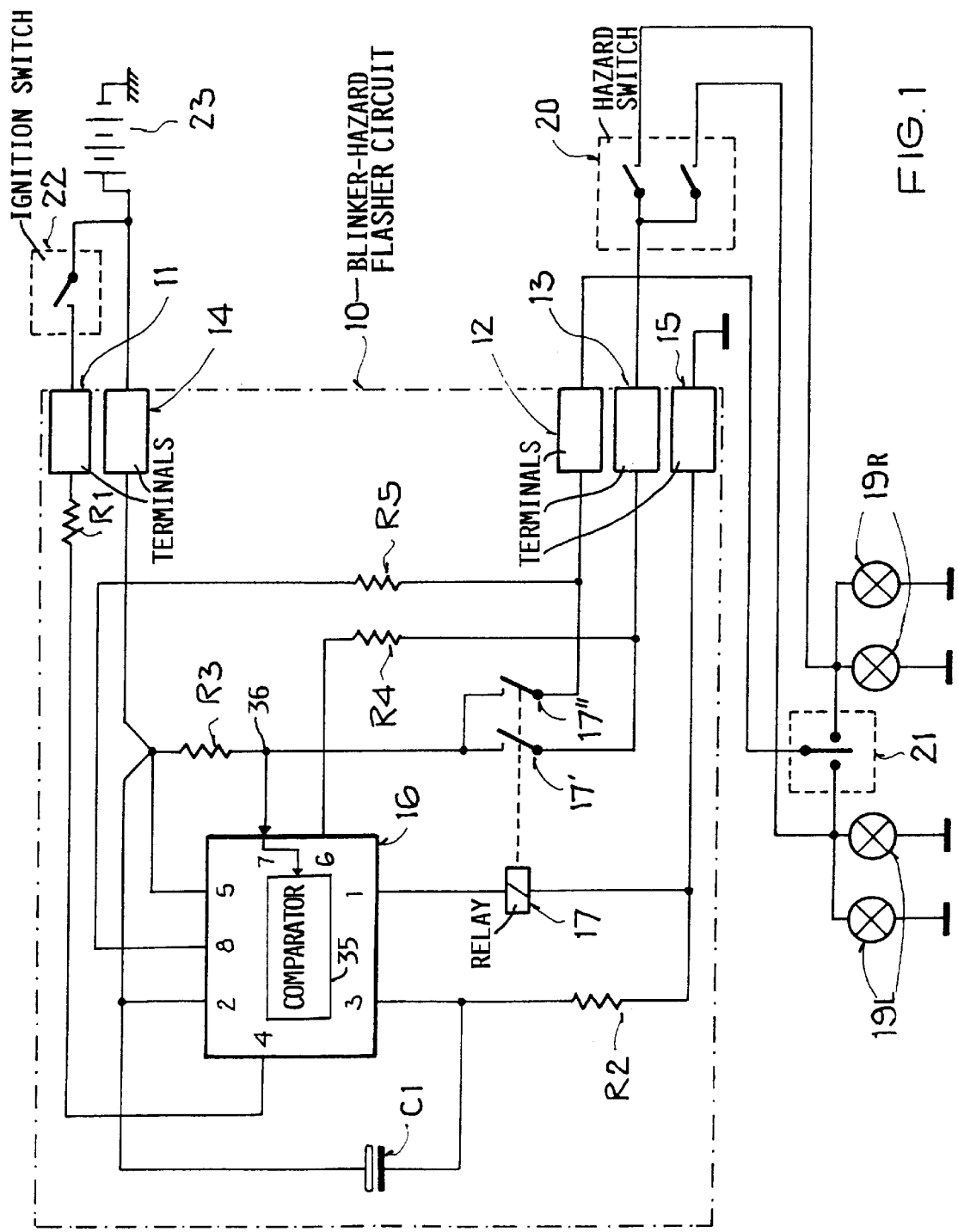
FIG. 1 is a block circuit diagram of a blinker hazard flasher circuit including an integrated blinker control circuit.

FIG. 1 shows a block diagram of an electronic blinker hazard flasher circuit 10 that is to be monitored. The circuit 10 has three open loop control inputs, namely an ignition input terminal 11, a directional blinker switch terminal 12 and a hazard switch terminal 13. Further terminals include a battery terminal 14 and the grounded terminal 15. An integrated circuit 16 of the circuit 10 comprises eight external terminals 1 to 8 which means that the circuit can be arranged in an eight terminal DIP housing or in an S08 housing.

Terminal 1 of the integrated circuit 16 forms, for example, a so-called relay driver output to which, in addition to a relay, the gate of a power MOSFET or of an IGBT may be connected. Terminal 2 is connected to the supply voltage provided by a battery 23 through a battery terminal 14. Terminal 3 is connected through a resistor $R_2$ to the terminal 15 which in turn is connected to ground or any other base potential. Terminal 4 is connected through a resistor $R_1$ to the terminal 11 which in turn is connected to an ignition switch 22, one terminal of which is connected to the battery 23. Terminal 6 is connected through a resistor $R_4$ to terminal 13 which in turn leads to a manual hazard switch 20. Terminal 7 provides the above mentioned measured signal that contains the status information to be monitored at an output terminal 36. The processing of the measured signal will be described in more detail below. The measuring terminal 7 is connected to the battery potential through a measuring shunt resistor $R_3$. Terminal 5 of the integrated circuit 16 is connected to the battery terminal 14. Terminal 8 is connected through a resistor $R_5$ to the terminal 12 which in turn is connected to the manual blinker switch 21 for operating directional left blinker lamps 19L or right blinker lamps 19R.

A capacitor $C_1$ is connected between the terminals 2 and 3. The capacitor $C_1$ functions as a support capacity when negative parasitic voltages occur. The above mentioned ohmic resistors $R_1$, $R_2$, $R_4$ and $R_5$ are arranged in the conductors to the terminals 4, 3, 6 and 8, respectively, for protecting the integrated circuit 16 against interference impulses and against wrong polarity connections. The measuring resistor is a low ohmic resistor $R_3$, for example a resistor of 20 mΩ is used as a measuring shunt resistor in the conductor between the battery terminal 14 and the measuring terminal 7 to provide the measured signal 36 or rather the measured signal at the terminal 36.

A blinker relay 17 functioning as a switch is connected to terminal 1 of the integrated circuit 16. Two relay contacts 17' and 17" of the blinker relay 17 activate blinker lamps 19L or 19R or both sets of lamps when hazard flashing takes place. Contact 17' prepares a circuit for operation by the hazard flasher switch 20. Relay contact 17" prepares a circuit for operation by the blinker switch 21. As mentioned, the ignition switch 22 and the vehicle batter 23 are connected to the terminal 11. The circuit arrangement of the hazard switch 20 must be capable of activating other blinker lamps 19L and 19R even if the ignition switch 22 is switched off. Circuit components for such hazard flashing are conventional and hence not shown in further detail.

The measured signal 36 of the integrated circuit 16 is a voltage drop across the measuring shunt resistor $R_3$ and provides an indication for several circuit conditions such as how many blinker lamps 19L, 19R are connected to the circuit, whether additional blinker lamps, for example those of a trailer have been connected to the circuit 10, or whether one or more blinker lamps have failed or whether a short-circuit is present in the blinker hazard flasher circuit 10.

Figure 2:
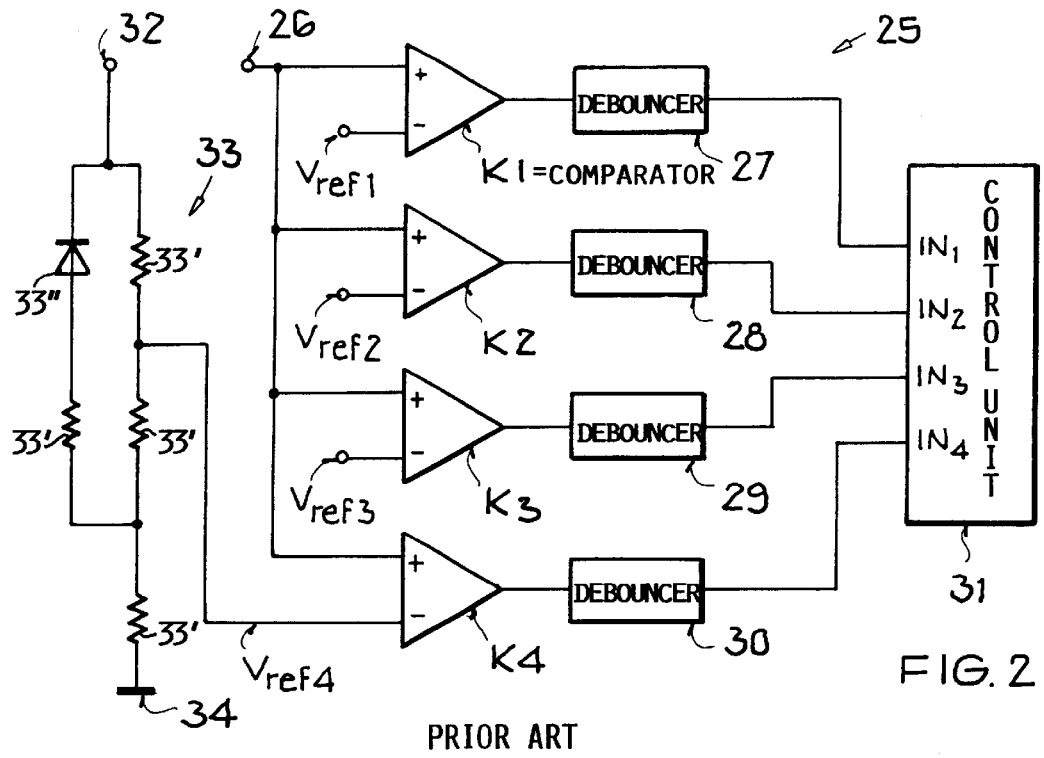
FIG. 2 is a block circuit diagram of a conventional comparator circuit forming part of an integrated circuit including one separate comparator for each threshold level.

An electronic comparator circuit 35 to be described in more detail below is included in the integrated circuit 16. The circuit 35 is connected with its input to the measuring terminal 7 which in turn receives the measured signal 36 for comparing with different reference voltage levels. An internal control unit 31, for example shown in FIG. 2, is provided in the integrated circuit 16.

Figure 3:
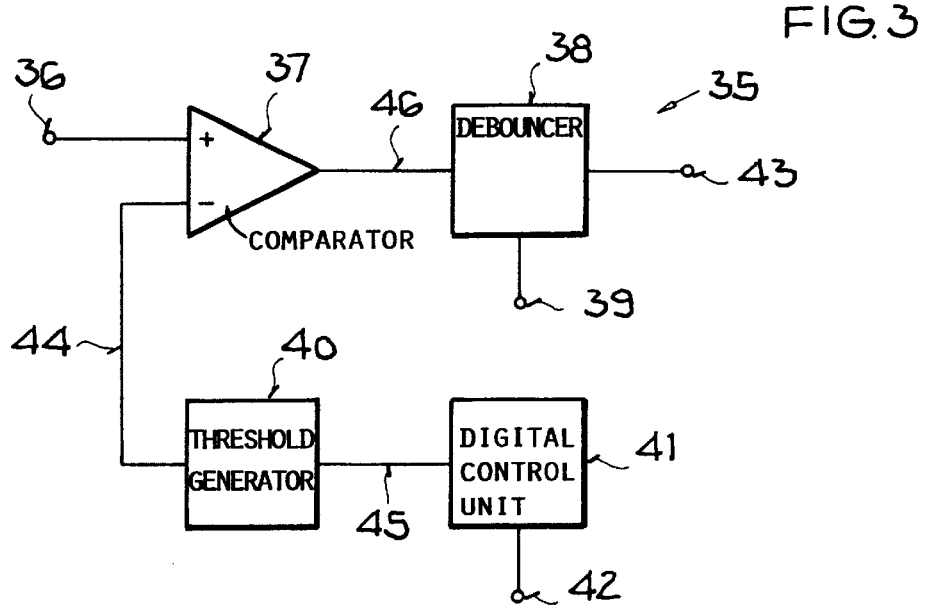
FIG. 3 is a block circuit diagram of a comparator circuit according to the invention with a threshold reference signal generator and a single comparator for all thresholds.

FIG. 3 shows a block diagram of the comparator circuit 35 according to the invention comprising a signal input for receiving the measured signal 36, a single comparator 37 connected to receive the measured signal 36, a digital debouncing circuit 38 connected to the output of the comparator 37 through a conductor 46 and providing at its output 43 an information representing signal as will be described in more detail below. The debouncing circuit 38 has a clock signal input 39 connected to a clock signal generator not shown, but provided in the integrated circuit 16. The other input of the comparator 37 is connected through a conductor 44 to the output of a threshold generator 40 having a control input connected through a conductor 45 to a digital control unit 41 which in turn has a clock signal input terminal 42.

More specifically, the measured signal 36 is supplied, for example to the non-inverting input of the comparator 37 while the inverting input receives the several different reference voltage signal levels or thresholds produced by the threshold generator 40. However, if required, the measured signal 36 could be supplied to the inverting terminal of the comparator and the reference thresholds could be supplied to the non-inverting terminal of the comparator 37. The oscillator inputs 39 and 42 do not need to receive identical clock signals. The output 43 of the debouncing circuit 38 provides output signals that contain the above mentioned status informations of the circuit 10 and its external components such as the lamps 19L and 19R and conductors.

The single comparator 37 compares the measured signal 36 with a reference signal threshold supplied to its inverting input and having a controlled predetermined threshold level that is varied in accordance with the present invention. Different informations are provided by the present circuit in response to certain reference voltage levels or thresholds. For this purpose, the measured signal 36 is compared with different reference voltage levels which are produced by the threshold generator 40 in response to the control from the digital control unit 41 that provides a programmed measuring sequence that provides a sequentially occurring different reference voltage levels or thresholds as will be described in more detail below. The output signal from the comparator 37 is debounced by the digital debouncing circuit 38 that provides the output signal at its output 43 for further processing. Such further processing or signal evaluation can, for example be performed by a control unit comparable to the control unit 31 shown in FIG. 2 to provide signals suitable for visual and/or audio indication to a driver of a vehicle.

Figure 4:
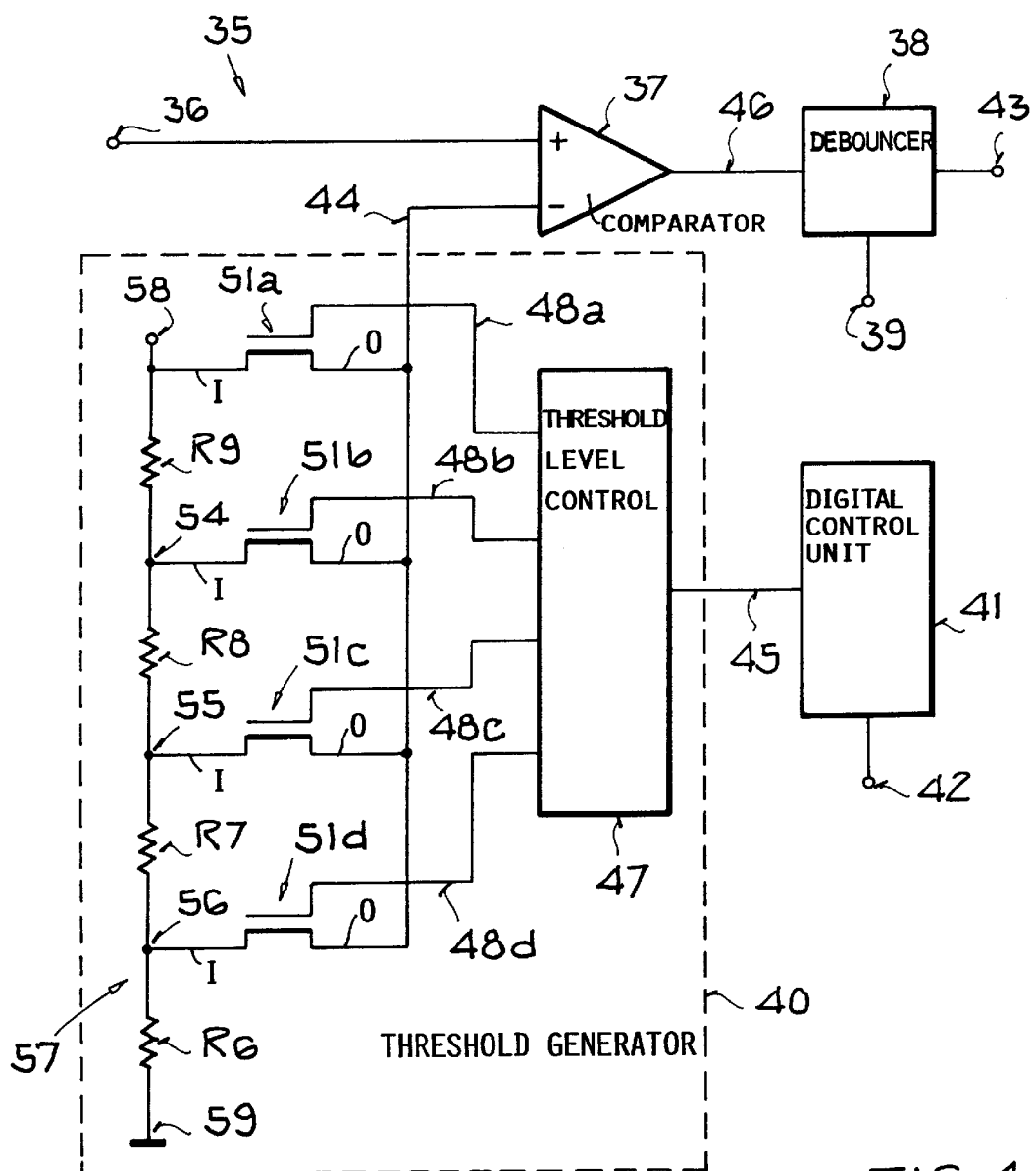
FIG. 4 is a block circuit diagram showing further details of the threshold generator of FIG. 3.

FIG. 4 shows the threshold generator 40 of FIG. 3 in more detail. The comparator 37, the debouncer 38, and the digital control unit 41 are the same in FIG. 4 as in FIG. 3. The output of the digital control unit 41 is connected through a conductor 45 to the input of a further internal control unit 47 forming part of the threshold generator 40. Different control outputs of the threshold level control 47 are connected through respective conductors 48a, 48b, 48c and 48d to control inputs of, for example four transmission gates or analog switches 51a, 51b, 51c, and 51d. At any one time only one of these analog switches is in its ON-state.

The output O of each of these analog switches or transmission gates 51a to 51d is connected to a common conductor 44 which in turn is connected to the inverting input of the single comparator 37. The respective input I of the analog switches is connected to respective tabs 54, 55, 56 and 58 of a voltage drop electrical resistor chain 57 comprising in the example four ohmic resistors $R_6$, $R_7$, $R_8$ and $R_9$ connected in series with each other. A terminal 58 of the resistor chain 57 may optionally be connected to an external or internal reference voltage source not shown while the other terminal 59 of the chain 57 is connected to a given base potential such as ground or another voltage. The resistor chain 57 produces different reference voltages at the terminals 54, 55, 56 and 58 which are individually transmitted through the respective gates 51a to 51d and through the conductor 44 to the inverting input of the comparator 37.

The digital control unit 41 comprises a sequence program which determines which of the reference voltage levels produced by the chain 57 is momentarily supplied to the inverting input of the comparator 37, the respective sequence control signals are supplied through the conductor 45 to the internal control unit 47 which in turn, at one time, causes one of the transmission gates 51a to 51d to conduct thereby closing the respective switch and opening the other transmission gates or switches. As a result, at any one time the desired or required reference voltage level is supplied to the inverting input of the comparator 37.

Figure 5:
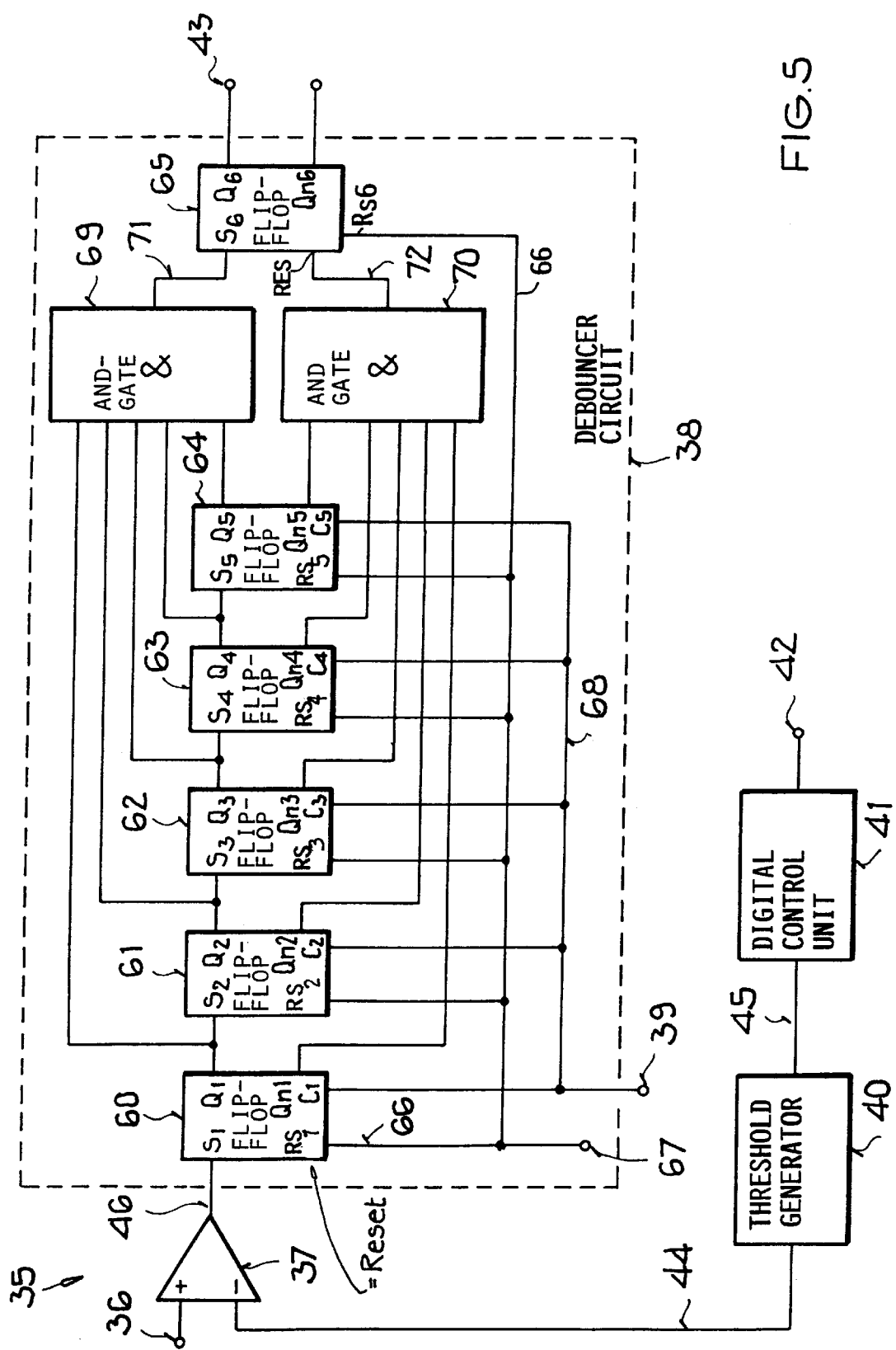
FIG. 5 is a block circuit diagram showing further details of the debouncer circuit of FIG. 3.

FIG. 5 shows a block circuit diagram similar to that of FIG. 3, however illustrating in more detail the construction of the digital debouncing circuit 38. The other circuit components are the same as in FIGS. 3 and 4. The debouncing circuit 38 comprises for example five series connected digital flip-flops 60, 61, 62, 63 and 64 and a reset-set flip-flop 65. Each of the digital flip-flops 60 to 64 comprises a setting input $S_1$ to $S_5$, and a resetting input $RS_1$ to $RS_3$. Each flip-flop 60 to 64 further includes a clock signal input $C_1$ to $C_5$ and two complementing outputs $Q_2$ to $Q_5$ and $QN_1$ to $QN_s$. The flip-flop 65 has a setting input $S_6$ a first resetting input RES and a second resetting input $RS_6$. Each of the resetting inputs $RS_1$ to $RS_6$ are connected through a conductor 66 to a reset signal terminal 67. This terminal receives a reset signal at determined points of time, for example when the circuit is switched on, whereby a so-called "power-on-reset" signal is generated. Each clock signal input $C_1$ to C is connected through a conductor 68 to the terminal 39 for receiving a clock signal from a clock signal generator forming part of the integrated circuit 16.

The debouncing circuit 38 further comprising two AND-gates 69 and 70, each including five inputs for each of the digital flip-flops 60 to 64. The output of the AND-gate 69 is connected through a conductor 71 to the setting input $S_6$ of the flip-flop 55. The output of the AND-gate 70 is connected through a conductor 72 to the reset input $RES_6$ of the flip-flop 65. The output $Q_6$ of the flip-flop 69 is connected to an output terminal 43 which provides the information signal of the entire circuit 35, The output of the comparator 37 is connected through a conductor 46 to the input $S_1$ of the first flip-flop 60. The output signal from the comparator 37 may either be a logic "1" (positive signal) or a logic "0" (negative signal). When the next clock signal occurs at the terminal 39, the signal currently present at the setting input $S_1$ is transmitted either to the output $QN_2$ or to the output $QN_1$ depending on whether the signal was positive or negative. A signal present at the output $Q_1$ is a positive signal and is simultaneously supplied to the input $S_2$ of the flip-flop 61 as well as to one of the inputs of the AND-gates 69. A negative signal present at the output $QN_1$ of the first flip-flop 60 will be supplied to one of the inputs of the AND-gate 70.

The just described sequence of signal transmission repeats itself in each of the following digital flip-flops 61 to 64 connected in series as a shift register. When five sequentially occurring positive signals appear at the input Si, a positive signal will appear, after a total of five clock signals, at each of the five inputs and thus also at the output of the AND-gate 69 which supplies this positive signal through the conductor 71 to the input $S_6$ of the flip-flop 65. During the next following clock signal a positive signal appears at the output $Q_6$ and thus at the output terminal 43 of the circuit 35.

It follows, that a positive or negative signal (logic "1" or logic "0") is present only at the terminal 43 if the output of the comparator 37 provides either a positive signal for five sequential clock signals, or a negative signal for five sequential clock signals. As a result, the instantaneous status of the debouncer circuit 38 is maintained until the signal at the input $S_1$ has stabilized. The signal at the input $S_1$ may not be stable when contact bouncing occurs or when other undefined switching conditions prevail so that positive and negative signals occur at the output of the comparator 37 in a random sequence. Due to the just described operation the signal at the output terminal 43 remains unchanged if fewer than five positive signals or fewer than five negative signals occur during five sequential clock signals. Thus, the signal at the output 43 is debounced.

There are two possibilities of resetting a positive signal appearing at the output terminal 43. First, a reset signal may be supplied to the internal reset terminal 67, whereby all digital flip-flops 60 to 67 and the flip-flop 65 are reset. Second, there it is possible that a logic "0" is present at the input $S_1$ of the flip-flop 60 for the duration of five clock signals. As a result, a positive signal is present at all five inputs of the flip-flops 60 to 64 and also at the output of the AND-gate 70. Such positive signal is transmitted through the conductor 72 to the reset input RES of the flip-flop 65, whereby the latter is reset so that at the output $Q_6$ and correspondingly at the terminal 43, a logic "0" is present. The positive signal present at this time at the output $QN_6$ is not used further in this context.

The pulse diagrams shown in FIGS. 6a and 6b are based on the block circuit diagram 35 of FIG. 3. The measured signal 36 shown in FIG. 1, is compared with a plurality of different reference voltage level thresholds during a plurality of sequentially occurring measuring cycles, whereby the reference voltage levels are generated by the threshold generator 40. FIG. 6a shows the reference voltage levels or thresholds SW1, SW2, SW3 and SW4 as a function of time and with reference to a suitable base voltage SW0). FIG. 6b illustrates the points of time during which a comparing takes place following a debouncing, whereby the shown voltage impulses represent the current flowing through the measuring resistor $R_3$ in FIG. 1.

A first measuring cycle begins, for example, at time $t_o$. At this time the threshold generator 40 is preferably adjusted to a suitable base voltage SW0. During normal blinking providing directional right and left turn signals the circuit is in the operational mode "directional blinking", the control unit 41 provides a control signal to the threshold generator 40 at a time $t_1$ to produce, starting from the base voltage SW0, a first reference voltage level or threshold SW4 which is the highest threshold in the sequence of thresholds as shown in FIG. 6a. With the help of this highest first threshold level SW4 the present circuit checks whether in the circuit 10 of FIG. 1 there is a short-circuit, for example in the blinker circuit portion. Such short-circuit is indicated by the fact that a too high current flows through the measuring resistor $R_3$. Such an excessive current could damage or destroy the integrated circuit 16, the blinker relay 17 and other circuit components including connecting conductors. The threshold or comparing voltage level SW4 is also referred to as the short-circuit threshold since it permits detecting the largest current flowing through the measuring resistor $R_3$.

At the next following time $t_2$ the measuring of the voltage drop across the resistor $R_3$ is started. During the time between $t_2$ and $t_3$ a debouncing operation takes place in the debouncing circuit 38 which debounces the output signal from the comparator 37. Thus, the time duration between $t_2$ and $t_3$ is referred to as a debouncing time. The voltage drop across the resistor $R_3$ is then measured at the time $t_3$. Such voltage drop is also a measure of the current flowing through the measuring shunt resistor $R_3$ thus permitting the evaluation of the operational status of the integrated circuit 16. If at the measuring time $t_3$ the voltage drop across the resistor $R_3$ exceeds the reference voltage threshold SW4, a short-circuit in the blinker circuit is indicated. As a result, the blinker relay 17 is deactivated and following a predetermined lapse of time the voltage drop at the measuring resistor $R_3$ is again measured. As long as a short circuit is present the operational status "short-circuit" is maintained during which the blinker relay 17 is activated only for very short time durations just sufficient to again measure the voltage drop across the measuring shunt resistor $R_3$.

At the time $t_4$ a new lower reference voltage level or threshold SW3 is established at a level sufficiently lower than the first threshold SW4 for obtaining status information other than short-circuit information. The threshold SW3 is an indicator for the fact that additional blinker lamps or lights 19L, 19R as shown in FIG. 1 have been connected to the circuit. Such additional lamps may, for example, be the blinker lamps of a trailer. Thus, the operation "trailer being pulled" may be indicated. As in the sequence for ascertaining a short-circuit during the short-circuit threshold SW4, the output signal of the comparator 37 is also debounced between times $t_5$ and $t_6$ prior to the beginning of measuring the voltage drop at the resistor $R_3$ at the time $t_6$. If the measured voltage at this time exceeds the threshold SW3, the operational mode "trailer being pulled" is switched on and indicated provided that during the preceding measurement the short circuit threshold SW4 has not been exceeded by the measured signal 36.

At the next following time $t_7$ a reference voltage level or threshold SW2 is adjusted in the generator 40. The threshold SW2 is lower than the threshold SW3. This threshold SW2 is advantageously an indicator for the fact that all connected blinker lamps 19L, 19R are operational and that no additional blinker lamps have been connected to the blinker circuit. It also provides an indication that no blinker lamps are defective. Debouncing starts at time $t_8$ and continues to time $t_9$ at which time the voltage drop at the resistor $R_2$ is measured again. If the now measured voltage drop falls between the threshold SW3 and SW2, the normal operational status directional blinking or hazard flashing is maintained provided that there was no prior short-circuit indication.

At the time $t_{10}$ the last and lowest reference voltage threshold SW1 is generated by the generator 40. This threshold is preferably an indicator for the fact that one or several blinker lamps 19L, 19R have failed, as a result of which the current flowing in the blinker circuit is too low. The debouncing is performed between time $t_{11}$ and $t_{12}$ and the measurement of the voltage at $R_3$ takes place at time $t_{12}$. If the measured voltage at this time is between the thresholds SW2 and SW1 or below SW1 it will be indicated that one or several blinker lamps 19 have failed and the operational status "lamp failure" is switched on and indicated so that the driver is alerted to this fact either optically and/or acoustically. For examples the blinker frequency and thus the blinker ticking may be increased for the blinker relay 17 or a blinker control indicator lamp is switched on.

At the time tL3 the threshold generator 14 switches back to the base voltage SW0, whereupon a so-called "dark duration" begins during which the blinker lights 19L and 19R are switched off. At the time $t_{14}$ a new measuring cycle begins. The debouncing durations between $t_2$ and $t_3$, between $t_5$ and $t_6$, between $t_8$ and $t_9$, and between $t_{11}$ and $t_{12}$ are preferably each about 5 milliseconds. The method according to the invention and the circuit arrangement according to the invention are particularly suitable for use in an electronic blinker and hazard flasher circuit in which a voltage measured as a voltage drop across a measuring resistor is compared with a reference threshold of different levels. The result of such comparing provides information whether additional blinker lamps are connected, whether a short-circuit exists in the blinker circuit or whether blinker lamps have failed.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for monitoring a plurality of status criteria of a blinker-hazard flasher circuit including a number of blinker lights, said method comprising the following steps:
    a) generating a blinker-hazard output signal representing any one of said plurality of said status criteria;
    b) generating control signals in a control unit and supplying said control signals to a threshold signal generator (40);
    c) generating in said threshold signal generator (40), with reference to a base voltage (SW0) and in response to said control signals, sequentially lower threshold voltage signals corresponding in number to said plurality of status criteria;
    d) supplying said blinker-hazard output signal to a first input of a single comparator;
    e) supplying said sequentially lower threshold voltage signals to a second input of said single comparator;
    f) comparing in said single comparator said blinker-hazard output signal with said sequentially lower threshold voltage signals for producing different comparator output signals that are allocated to different specific status criteria of said plurality of status criteria; and
    g) processing said comparator output signals for further use.

2. The method of claim 1, wherein said step of generating sequentially lower threshold voltage signals comprises generating a first highest threshold voltage signal (SW4) that is higher than any following threshold voltage signals, generating a second threshold voltage signal (SW3) that is lower than said first threshold voltage signal, generating a third threshold voltage signal (SW2) that is lower than said second threshold voltage signal, and generating a fourth threshold voltage signal (SW1) that is lower than said third threshold voltage signal, wherein said comparing step in said single comparator comprises: sequentially comparing said blinker-hazard output signal:
    a) with said first threshold voltage signal (SW4) for detecting a short circuit in said blinker-hazard flasher circuit,
    b) with said second threshold voltage signal (SW3) for detecting that additional blinker lights have been connected to said blinker-hazard flasher circuit,
    c) with said third threshold voltage signal (SW2) for detecting that all blinker lights connected to said blinker-hazard flasher circuit work properly and no additional blinker lights have been connected, and
    d) comparing with said fourth threshold voltage signal (SW1) for detecting that at least one blinker light has failed.

3. The method of claim 2, further comprising switching off a blinker relay in said blinker-hazard flasher circuit in response to said detecting of said short circuit.

4. The method of claim 1, wherein said further processing comprises passing said comparator output signal through a debouncing circuit and using a resulting debounced signal as an indicator signal in a blinker-hazard flasher circuit.

5. A circuit system for monitoring a plurality of status criteria of a blinker-hazard flasher circuit, said circuit system comprising a control unit (41), a reference signal generator (40) connected through a conductor (45) to said control unit (41) for generating different sequentially lower reference signal threshold levels in response to control signals from said control unit (41), a single comparator (37) having a first input connected to receive a blinker-hazard flasher output signal containing information regarding said status criteria of said blinker-hazard flasher circuit and a second input connected to said reference signal generator for receiving said different sequentially lower reference signal threshold levels and for comparing said blinker-hazard output signals with said different sequentially lower reference signal threshold levels, said comparator (37) having an output (38) for providing comparator output signals that are allocated to different specific status criteria of said blinker-hazard flasher circuit for further processing to retrieve said information.

6. The circuit of claim 4, further comprising a digital signal debouncing circuit (38) having an input connected to said comparator output for supplying said comparator output signal for further processing said comparator output signal.

* * * * *